E. M. SKINNER.
AUXILIARY TOOL FOR USE IN CONNECTION WITH SPADES.
APPLICATION FILED MAY 9, 1908.
962,723.
Patented June 28, 1910.
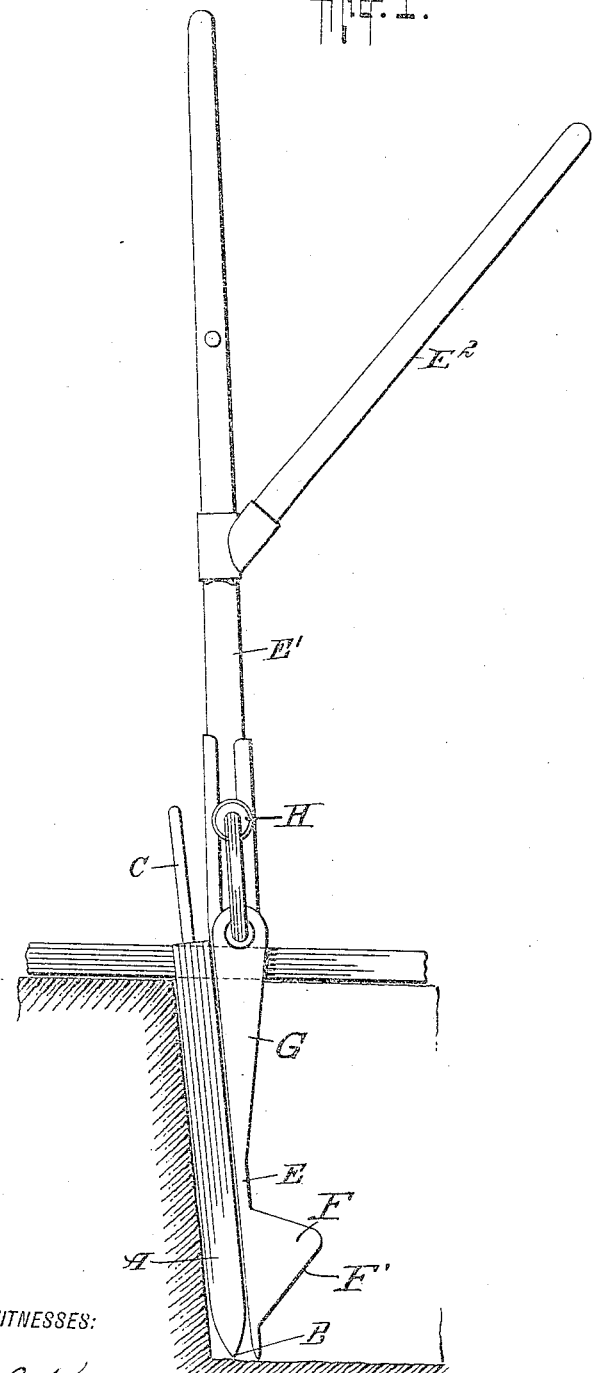
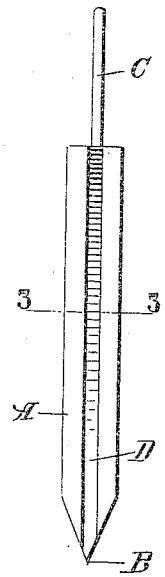
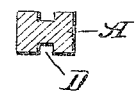
WITNESSES:
INVENTOR
Edwin M. Skinner
BY
ATTORNEYS

UNITED STATES PATENT OFFICE.

EDWIN M. SKINNER, OF FORT WADSWORTH, NEW YORK.

AUXILIARY TOOL FOR USE IN CONNECTION WITH SPADES.

962,723. Specification of Letters Patent. Patented June 28, 1910.

Original application filed January 30, 1908, Serial No. 413,400. Divided and this application filed May 9, 1908. Serial No. 431,769.

*To all whom it may concern:*

Be it known that I, EDWIN M. SKINNER, a citizen of the United States, and resident of Fort Wadsworth, Staten Island, borough and county of Richmond, city and State of New York, have invented certain new and useful Improvements in Auxiliary Tools for Use in Connection with Spades, of which the following is a specification.

My invention relates to an auxiliary tool for use in connection with spades, and has for its object to provide a device which will facilitate the removing of sods from a trench. In digging trenches particularly in meadows and marsh lands, as the spade is moved to remove the sod a vacuum tends to form between the spade and the transverse wall of the trench. Unless this vacuum is destroyed it is almost impossible to remove the sod and my invention is particularly intended to overcome and destroy such vacuum.

My invention will be fully described hereinafter and the features of novelty will be pointed out in the appended claims.

Reference is to be had to the accompanying drawings, in which—

Figure 1 is a side view partly in section, showing my auxiliary tool in operative position; Fig. 2 is a face view of the said tool; and Fig. 3 is a section thereof on the line 3—3 of Fig. 2.

A represents the body of the tool or venting device, which is preferably pointed at its lower end as indicated at B and is provided at its opposite end with a handle C. The body of the tool or venting device, is formed with grooves D, which are arranged on opposite sides thereof and which extend lengthwise of the body of the tool from the handle to the point.

E represents the blade of the shovel or spade and E' and E² are the handles thereof. The blade E of the shovel is provided with projections F which extend outwardly substantially at right angles to said blade and which are provided with cutting edges F'. Flanges G are arranged along each side edge of the blade and grips H are provided for the purpose of raising or lowering the shovel or spade.

In digging trenches in meadows or marsh lands, as the blade of the shovel is moved in the arc of a circle to remove the sod, a vacuum is produced between the back of the spade and the transverse wall of the trench, which as before stated, must be destroyed before the sod can be easily removed from the trench. In operation the shovel or spade is first forced into the ground until the blade has been completely embedded therein, after which the shovel or spade is forced away from the workman, loosening the sod and thus leaving a space between the lateral or transverse wall of the trench and the rear face of the blade of the shovel. Into this space my auxiliary tool or venting device is introduced after which the handle of the spade is again drawn toward the workman and then forced in the arc of a circle and the sod is easily lifted from the trench. The auxiliary tool or venting device during this operation forms a bearing for the shovel, so that the rear face of the shovel blade is maintained out of contact with the transverse wall of the trench. The air rushes into the space between the said rear face of the blade and the said lateral wall of the trench and also through the grooves or channels D in the opposite faces of the auxiliary tool, so that any vacuum which may be formed is readily destroyed.

The present application is a division of one filed by me in the United States Patent Office on or about January 30th, 1908, Ser. No. 413,400.

I claim:

1. In combination with a tool for digging trenches, a removable venting device adapted for insertion at the rear of said tool.

2. In combination with a tool for digging trenches, a removable back bar adapted for insertion at the rear of said tool.

3. In combination with a tool for digging trenches, a venting device provided with a groove extending lengthwise thereof and open at the top and a handle on said tool fitted out of line with said groove.

4. In combination with a tool for digging trenches, a venting device comprising a body provided with grooves on opposite sides extending lengthwise thereof and open at the top and a handle on said device fitted between said grooves.

5. In combination with a tool for digging trenches, a venting device comprising a body provided with oppositely disposed grooves extending lengthwise thereof and further having a pointed end and a handle secured to said body.

In testimony whereof I have hereunto set my hand in the presence of two subscribing witnesses this 6th day of May, 1908.

EDWIN M. SKINNER.

Witnesses:
  JOHN A. KEHLENBECK,
  JOHN LOTKA.